A. ANDERSON & L. W. GOLDY.
SOLDERING IRON.
No. 170,800. Patented Dec. 7, 1875.
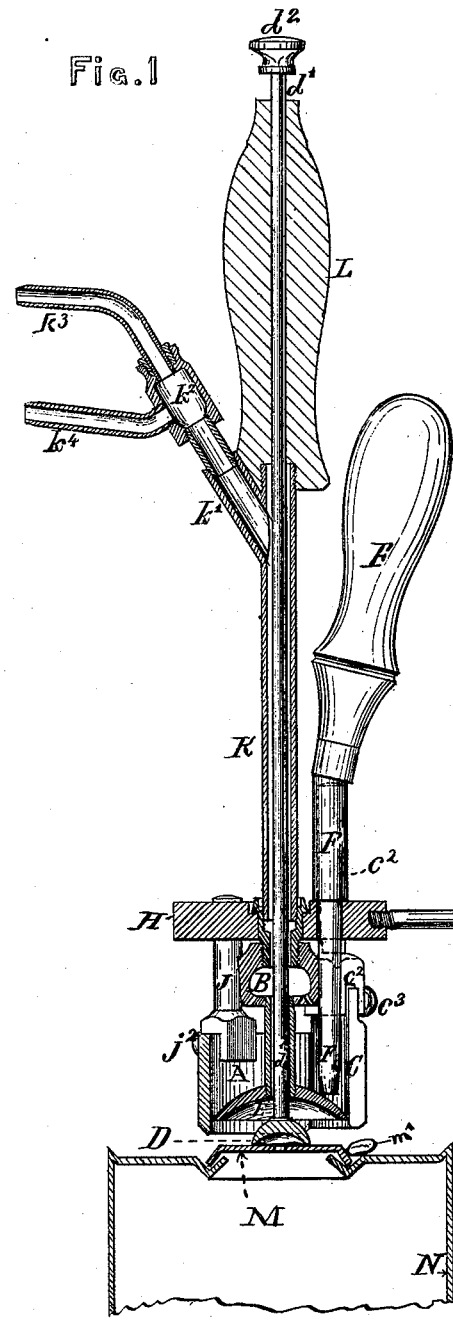
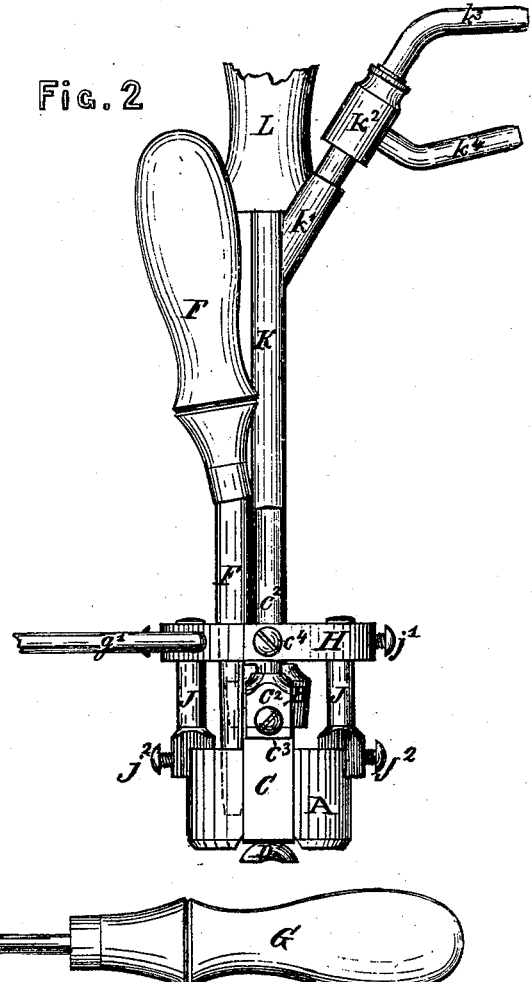

UNITED STATES PATENT OFFICE.

ABRAHAM ANDERSON AND LEANDER W. GOLDY, OF CAMDEN, NEW JERSEY.

IMPROVEMENT IN SOLDERING-IRONS.

Specification forming part of Letters Patent No. 170,800, dated December 7, 1875; application filed September 23, 1875.

*To all whom it may concern:*

Be it known that we, ABRAHAM ANDERSON and LEANDER W. GOLDY, both of Camden, New Jersey, have invented an Improved Soldering-Iron for Cans for Fruits and other Goods, of which the following is a specification:

The object of our invention is to provide a machine for soldering the caps on fruit-cans. It consists, chiefly, of a soldering-ring, formed of a piece of sheet-steel bent into the form of a ring, with a copper bit placed in the opening where the two ends of the ring come together; also, in the combination of the said soldering-ring with a steadying-foot and heating apparatus; also, in the combination of the said ring with a separate soldering-iron and heating apparatus.

In the drawing, Figure 1 is a vertical section through the machine. Fig. 2 is an elevation of the machine with the handles partly broken off.

A is the ring; B, the gas-burner, the bottom of which is pierced with a number of small holes; C, a copper bit for melting the solder. This works freely between the ends of the ring, and is held in position by the clamp $c^2$ by means of the adjusting-screw $c^3$.

On the rod $d^1$ is a button, D. The rod, having a vertical movement, is actuated by means of knob $d^2$, shown at top of rod.

E is a disk for directing the gas-jet on the ring A. F is a separate soldering-iron; a hole is made in plate H for its reception, through which it extends to near the disk E. While the machine is soldering the caps, the rod is being heated ready for use. G is the handle, screwed into plate H, for revolving the soldering-iron. J J are three supports for the ring A; they are made adjustable by screws $j^1$. The soldering-ring A is secured to the supports J by the set-screws $j^2$. K is a hollow pipe, connecting the upright handle L and the gas-burner B. $k^3$ and $k^4$ are pipes for the admission of air and gas, respectively meeting in a nozzle, $k^2$. This nozzle is connected with the main pipe K by a small pipe, $k^1$.

The machine operates in this way: The pipe $k^3$ is connected by a suitable rubber hose to a bellows for supplying the air, and the pipe $k^4$ to a gas-burner in the room or workshop. The air and gas, commingling together in the nozzle $k^2$, pass down pipe K to the burner B, and out of the perforations at the bottom. A match is then applied; the machine soon becomes heated and ready for use.

A can, N, is placed on a bench, and the cap, M, to be soldered is laid on the can in position. A small piece of solder, $m'$, is laid in the groove around the cap. The left hand grasps the handle L, with the thumb pressing down the knob $d^2$, while the right hand grasps the handle G. The machine is then placed on the can, so that the copper bit C is over the piece of solder. The pressure of the thumb upon the cap $d^2$ keeps the machine central on the cap M. The handle L is released and the bit C falls into contact with the solder, which it immediately melts. The turning of the ring A by means of the handle G distributes the solder around the groove, and the cap is soldered. In the center of the cap is a vent-hole, which is afterward soldered by means of the separate soldering-iron F, which, being placed in the machine in contact with the gas-jet, is always ready heated, and is removed from the machine whenever required for use.

We claim—

1. The combination of pipe K, burner B, rod $d^1$, foot D, disk E, bit C, and steel ring A, for the purpose described and set forth.

2. The combination of the burner B, disk E, soldering-ring A, and the plate H, having a perforation to admit the insertion and heating of a separate soldering-iron, substantially as herein described.

3. The steel ring A, in combination with the copper bit C, to form a soldering-iron, substantially as herein described.

ABRAHAM ANDERSON.
LEANDER W. GOLDY.

Signed in the presence of—
JAMES C. BLACKWOOD,
C. N. D. JOLINE.